US010511886B1

United States Patent
Rastogi et al.

(10) Patent No.: US 10,511,886 B1
(45) Date of Patent: Dec. 17, 2019

(54) LATENCY AND CPU UTILIZATION CONTROL FOR CONTENT ITEM SELECTION

(71) Applicant: Facebook, Inc., Menlo Park, CA (US)

(72) Inventors: Vibhor Rastogi, Redwood City, CA (US); Mircea Grecu, Menlo Park, CA (US); Puneet Sharma, San Jose, CA (US); Tianshi Gao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/027,216

(22) Filed: Jul. 3, 2018

(51) Int. Cl.
| | |
|---|---|
| *H04N 21/462* | (2011.01) |
| *H04N 21/45* | (2011.01) |
| *H04N 21/431* | (2011.01) |
| *H04N 21/438* | (2011.01) |
| *H04N 21/442* | (2011.01) |

(52) U.S. Cl.
CPC ....... *H04N 21/4621* (2013.01); *H04N 21/431* (2013.01); *H04N 21/4384* (2013.01); *H04N 21/4424* (2013.01); *H04N 21/4516* (2013.01)

(58) Field of Classification Search
None
See application file for complete search history.

(56) References Cited

U.S. PATENT DOCUMENTS

| 2015/0073920 A1* | 3/2015 | Pashkevich | G06Q 30/0275 705/14.71 |
| 2019/0018742 A1* | 1/2019 | Thomsen | G06F 11/1474 |

\* cited by examiner

*Primary Examiner* — Joshua Joo
(74) *Attorney, Agent, or Firm* — Fenwick & West LLP (57) ABSTRACT

When an online system receives a request to present content items to a user, a content selection system included in the online system selects content items for presentation to the user. A feedback control mechanism communicates with each computing device of the content selection system to determine the latency period and the CPU utilization of each computing device. The feedback control mechanism also determines a target latency period and a target CPU utilization in which content items are selected. By comparing the latency period of each computing device to the target latency period and the CPU utilization to the target CPU utilization, an amount of information to be evaluated by each computing device is determined based on the comparisons.

20 Claims, 4 Drawing Sheets

Receive a request for a content item for a user.
510

↓

Receive a set of candidate content items for evaluation in a content selection process, the content selection process controlled by a latency period parameter and a CPU utilization parameter.
520

↓

Retrieve a target latency period and a target CPU utilization for the evaluation of the set of candidate content items.
530

↓

Determine an actual latency period of the evaluation of the set of candidate content items.
540

↓

Update the latency period parameter based on a comparison of the target latency period and the actual latency period.
550

↓

Determine an actual CPU utilization of the evaluation of the set of candidate content items.
560

↓

Update the CPU utilization parameter based on a comparison of the target CPU utilization and the actual CPU utilization.
570

↓

Evaluate a difference set of candidate content items using the updated latency period parameter and the updated CPU utilization parameter.
580

FIG. 5

LATENCY AND CPU UTILIZATION CONTROL FOR CONTENT ITEM SELECTION

BACKGROUND

This disclosure relates generally to computer processes for selecting content items for users, and more specifically to using feedback control on parameters of a content selection process to meet latency and CPU utilization targets for that content selection process.

Presenting a user with content items that are relevant to the user increases both revenue for the online system and user enjoyment of and engagement with the online system. Conventionally, online systems use a content selection system that applies targeting or filtering rules to various content items for selecting content items to present to a user. For example, the content selection system identifies content items for which a user is in a defined target audience and then ranks these eligible content items in a content selection process, such as an online auction. The content selection system selects content items for presentation to the viewing user.

This selection process defines a latency period, which begins when an opportunity to present content to a user is identified by the online system and ends when the selected content items are sent for presentation to the user. The duration of the latency period depends on one or more content selection parameters, such as the number of content items to be ranked and the complexity of the models being used to score each of the content items. The latency may also depend on changes in traffic on the online system, e.g., caused by requests to present content to other users of the online system. Various factors may affect the traffic on the online system, such as time of day, occurrence of events, unexpected events, or other factors causing fluctuations in the demand placed on computing resources of the online system.

While the quality of content selected for presentation generally increases as the number of content items evaluated by the online system's content selection process increases and as the complexity of the models used to score the content items increases, the latency period and/or CPU utilization required to complete the selection process also increases due to limited computing resources of the online system. Because limited computing resources evaluate content items, increasing the number of content items evaluated causes a decline in system performance, which may result in a longer latency period, system delays, and possible network time-outs. Conversely, if the online system evaluates a small number of content items, the latency period is shorter, system performance may improve, but the quality of the content items presented to the users likely declines. This balance between latency and content quality is important for optimizing user engagement and revenue for an online system.

One method of processing a large number of content items without a long latency period is to use parallel computing to evaluate multiple content items simultaneously. In parallel computing, the rate at which the evaluation is done is adjusted by the number of threads. To maintain a target latency period, the number of parallel threads can be adjusted based on the variations in the number of content items that are evaluated. For example, if the number of content items being evaluated increases and is close to network time-out due to high latency period, the number of threads may be increased to evaluate the content items within a threshold of the target latency period. However, when the number of threads increases, the CPU utilization increases because more computation is performed at the same time. In this method, the latency period and the CPU utilization are coupled together and are not controlled independently. For example, if latency period needs to be increased but the CPU utilization needs to be decreased, there may be conflicting controls for the number of content items to be evaluated.

SUMMARY

To improve the quality of content items presented to a user of an online system while controlling the content selection process to achieve latency and/or CPU utilization targets, the online system applies a latency feedback control mechanism and a CPU utilization feedback control mechanism to select content items for presentation to the user. For example, the latency feedback control mechanism and the CPU utilization feedback control mechanism are applied to each computing device used to select content items. In one embodiment, the latency feedback control mechanism maximizes the number of content items that are evaluated while staying within a target latency period by using feedback control. Meanwhile, the CPU utilization feedback control mechanism maximizes the number of threads used for parallel computation of the content items that are evaluated for presentation while staying within a target CPU utilization.

To determine the target latency period in which to complete selection of content items, the online system periodically samples latency periods from each of the computing devices (e.g., processors) that select content items for presentation. The latency feedback control mechanism periodically samples latency periods of multiple devices that select content items for presentation and compares the sampled latency periods to the target latency period. The latency feedback control mechanism may be a proportional integral derivative ("PID") controller, or other suitable feedback mechanism determining a difference between measured latency periods and the target latency period. For a computing device with a latency period less than the target latency period, the feedback control mechanism increases the number of content items evaluated by the computing device during future user request for new content items until the latency period of the computing device reaches the target latency period. Conversely, for a computing device with a latency period greater than the target latency period, the latency feedback control mechanism decreases the number of content items evaluated by the computing device until the latency period of the device reaches the target latency period.

Similarly, the CPU utilization feedback control mechanism periodically samples CPU utilization of multiple devices that select content items for presentation and compares the sampled CPU utilization to the target CPU utilization. The target CPU utilization may be set to be a percentage of the maximum CPU utilization of the multiple devices (e.g., 85% of maximum CPU utilization). The CPU utilization feedback control mechanism may be a PID controller, or other suitable feedback mechanism determining a difference between measured CPU utilization and target CPU utilization. For a computing device with a CPU utilization less than the target CPU utilization, the CPU utilization feedback control mechanism increases the number of threads used to evaluate the content items until the CPU utilization reaches the target latency period. Conversely, for a computing device with a CPU utilization greater than the target CPU utilization, the CPU utilization feedback control mechanism decreases the number of threads used to evaluate the content items until the CPU utilization reaches the target CPU utilization.

In one embodiment, to avoid conflicts between the two feedback control mechanisms, the online system uses a different control variable for each feedback control mechanism (e.g., number of candidates, number of threads, and/or the allocated latency time). Additionally, the online system may perform one of the control mechanisms faster than the other so that the system can achieve a stable equilibrium.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
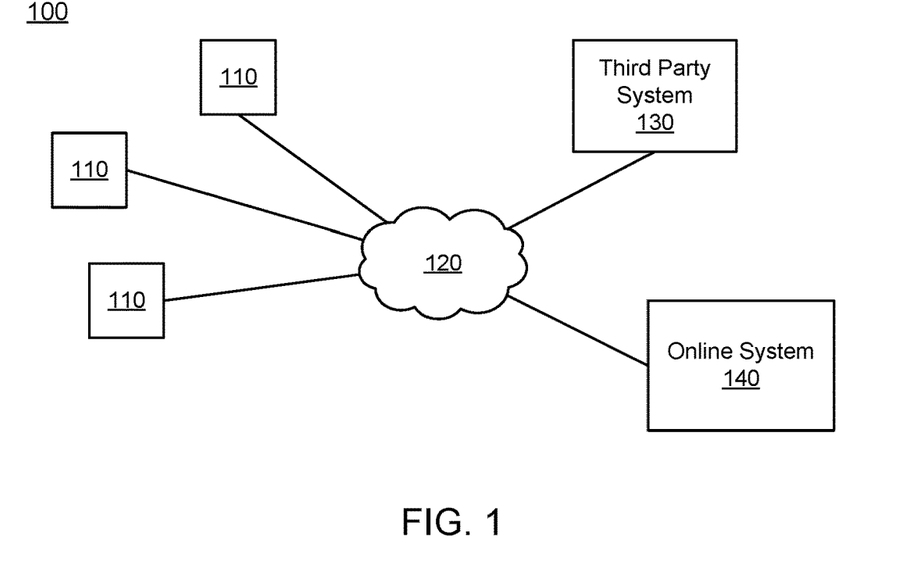
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
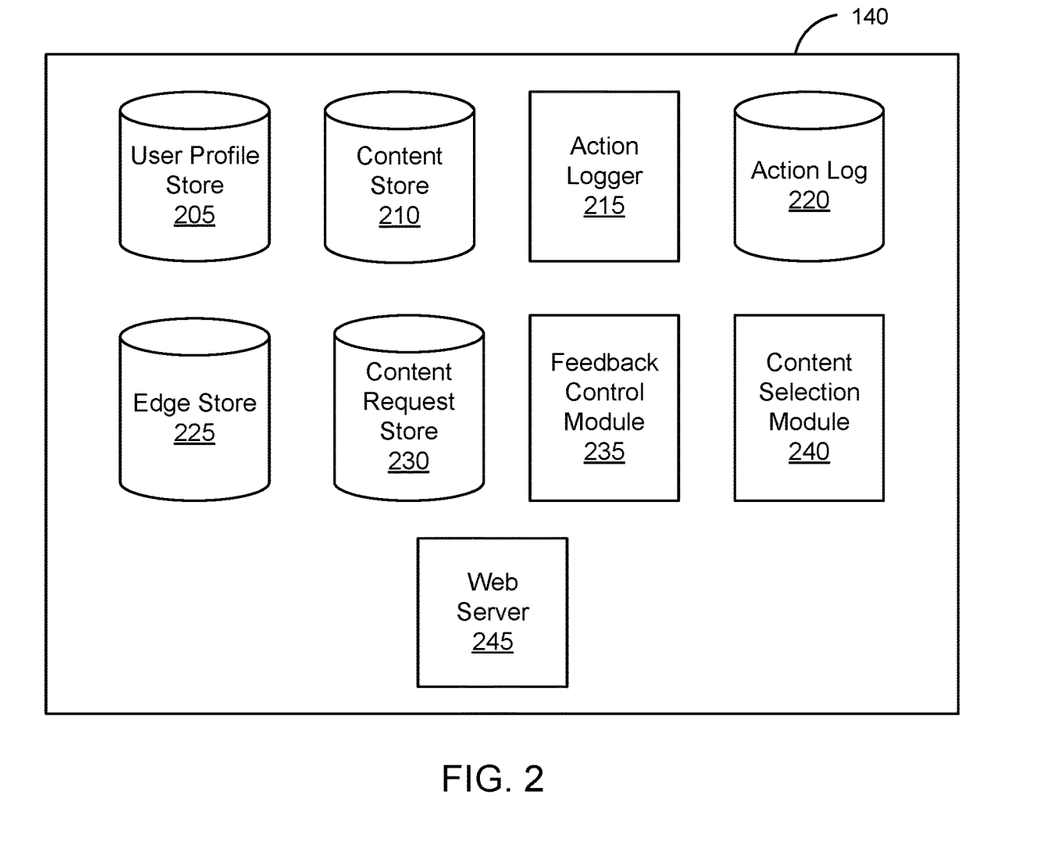
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content request store 230, a feedback control module 235, a content selection module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinities scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more content requests are included in the content request store 230. A content item request includes content item and a bid amount. The content item is text, image, audio, video, or any other suitable data presented to a user. In various embodiments, the content item also includes a landing page specifying a network address to which a user is directed when the content item is accessed. In some embodiments, the content item is an advertisement. The bid amount is associated with the content item by a content item publisher and is used to determine an expected value, such as monetary compensation, provided by a content item publisher to the online system 140 if the content item is presented to a user, if the content item receives a user interaction, or based on any other suitable condition. For example, the bid amount specifies a monetary amount that the online system receives from the content item publisher if the content item is displayed and the expected value is determined by multiplying the bid amount by a probability of the content item being accessed by a user.

Additionally, a content item request may include one or more targeting criteria specified by the content item publisher. Targeting criteria included in a content item request specify one or more characteristics of users eligible to be presented with content item in the content item request. For example, targeting criteria are used to identify users having user profile information, edges or actions satisfying at least one of the targeting criteria. Hence, targeting criteria allow a content item publisher to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows content item publishers to further refine users eligible to be presented with content from a content item request. As another example, targeting criteria identifies users having a connection to another user or object or having a particular type of connection to another user or object.

The feedback control module 235 controls the latency period and CPU utilization of each computing device used by the online system 140 to evaluate content items for presentation to an online system user. For example, the online system 140 includes multiple computing devices that each evaluate content items to select content items for presentation to a user, and the feedback control module 235 periodically samples the latency period and CPU utilization of each computing device. The feedback control module 235 has a latency feedback control mechanism that compares the sampled latency periods to a target latency period. Depending on the comparison, the latency feedback control mechanism may determine whether the number of content items evaluated by the computing devices should be increased or decreased in future evaluation of content items for presentation to the user. The feedback control module 235 also has a CPU utilization feedback control mechanism that compares the sampled CPU utilization to a target CPU utilization. Depending on the comparison, the CPU utilization feedback control mechanism may determine whether the number of threads used to evaluate content items should be increased or decreased in future evaluation of content items.

The content selection module 240 selects content items (e.g., ad requests from the ad request store 230) eligible for presentation to a user of the online system (i.e., candidate content items) based on targeting criteria associated with the content items. Based on the feedback control module 235, the number of content items being evaluated and the number of threads used to evaluate the number of content items is adjusted. Additionally, the content selection module 240 ranks candidate content items and selects content items for presentation to the user based on their position in the ranking. The content selection module 240 includes a complex machine learning model that generates a score for each candidate content item, and the scores are used to rank the candidate content items. Various criteria may be used to rank content items, with different criteria used to rank different types of content items. For example, advertisement requests are ranked based on their associated bid amount and/or targeting criteria, while stories or other non-commercial content items are ranked based on affinities of the user to be presented with the content item with objects or users associated with the non-commercial content items, prior user interactions with non-commercial content items, or other suitable information.

The web server 245 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Content Selection Process

Figure 3:
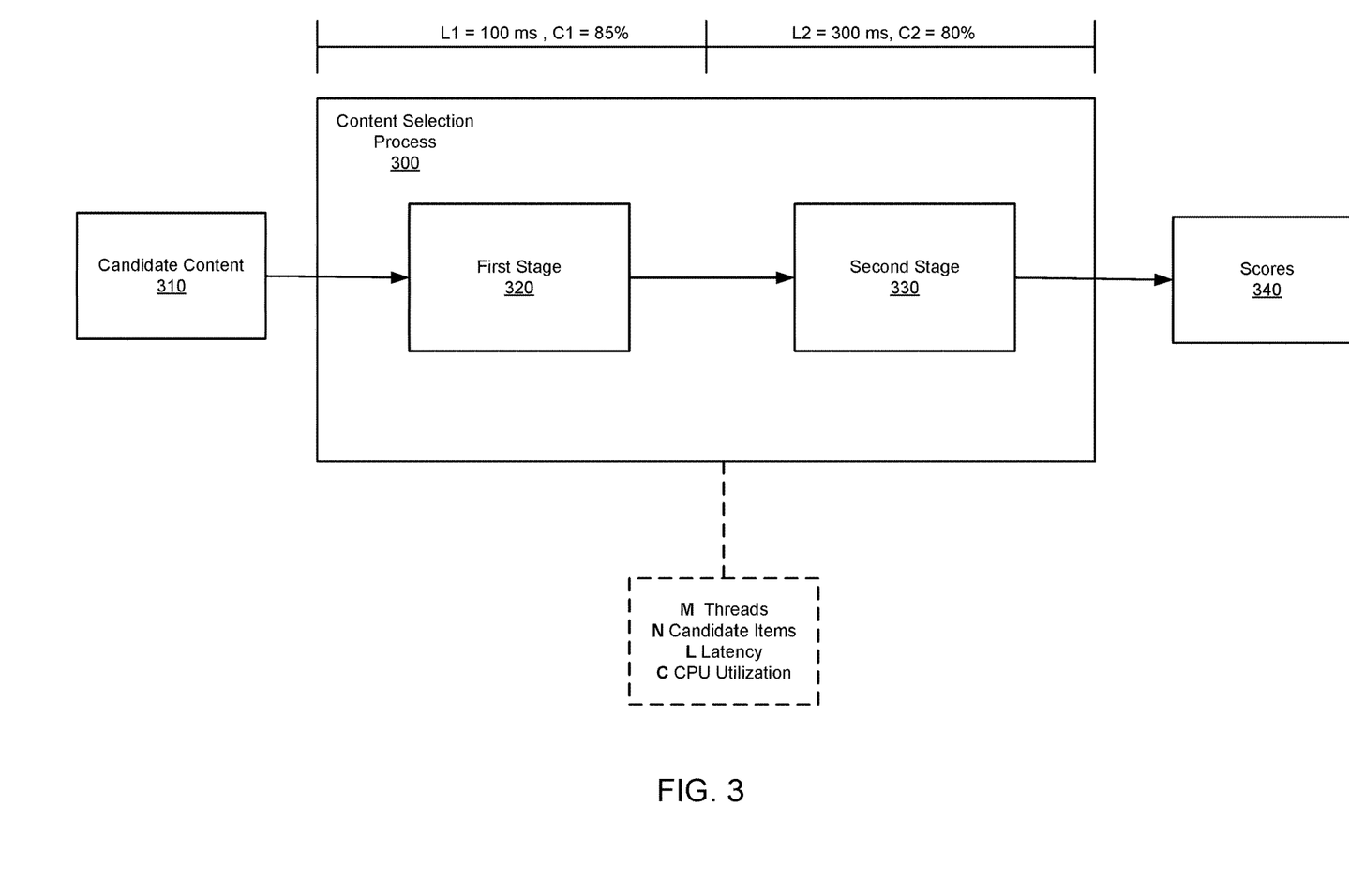
FIG. 3 is a block diagram of a content item selection process, in accordance with an embodiment.
Figure 4A:
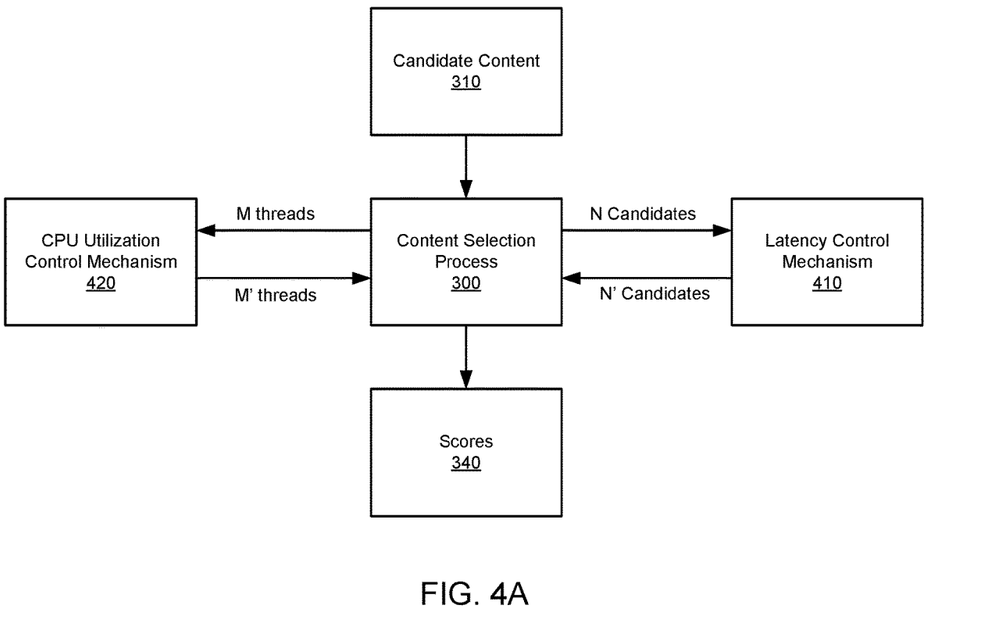
FIGS. 4A and 4B are block diagrams of a content selection process, a CPU utilization control mechanism, and a latency control mechanism, in accordance with an embodiment.
Figure 4B:
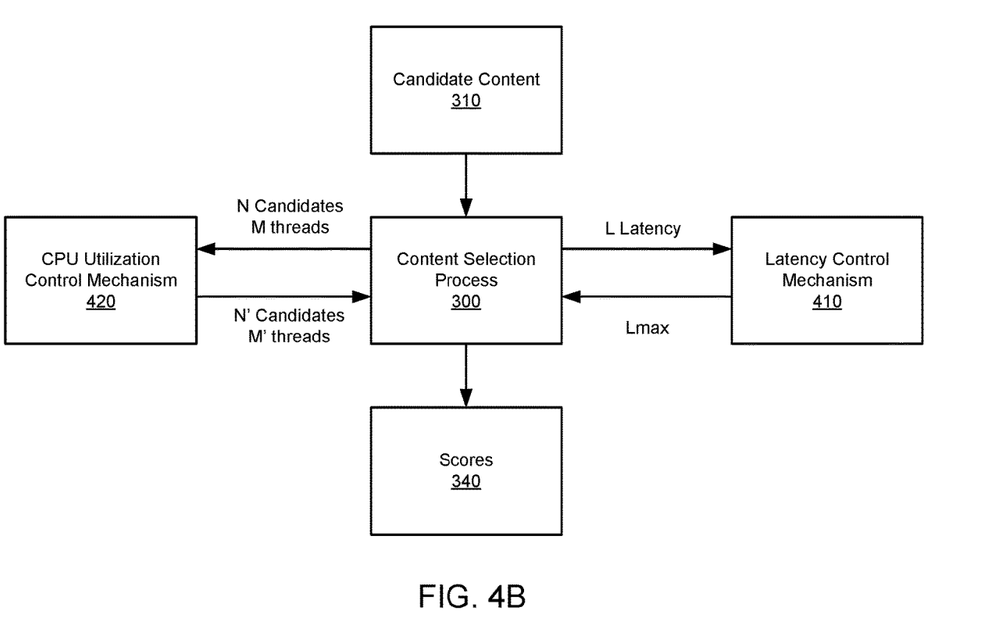

FIG. 3 is a block diagram of a content selection process, in accordance with an embodiment. The content selection process 300 receives N candidate items and evaluates the N candidate items using M threads. The values of N and M are determined by a latency control mechanism and a CPU utilization control mechanism, which are described below with respect to FIG. 4. The latency control mechanism controls the latency L of the content selection process 300 and the CPU control mechanism controls the CPU utilization C. In the example shown in FIG. 3, the content selection process 300 has a first stage 320 and a second stage 330 for evaluating the candidate content 310. In other embodiments, there may be fewer or additional number of stages in the content selection process 300. Based on the evaluation of the content selection process 300, a score 340 is determined for each of the N candidate items in the candidate content 310.

The feedback control module 235 determines the latency period and CPU utilization of each computing device used by the online system 140 to evaluate the candidate content 310 for presentation to an online system user. For example, the online system 140 includes multiple computing devices that each evaluate candidate content 310 to select content items for presentation to the user, and the feedback control module 235 periodically samples the latency period and CPU utilization of each computing device. Based on the previously sampled latency periods and CPU utilizations of various computing devices evaluating candidate content 310, the feedback control module 235 determines a target latency period and a target CPU utilization for selecting content items for presentation to a user.

In the example shown in FIG. 3, based on latency periods sampled from each computing device selecting candidate content 310 at 10-second intervals over a specified time interval (e.g., 10 minutes), the feedback control module 235 determines a target latency period of 400 milliseconds for the content selection process 300. In one embodiment, the target latency period is determined as a percentile of the sampled latency periods (e.g., 99th percentile). The feedback control module 235 compares the target latency period to latency periods sampled from each computing device selecting content items for presentation. Based on the comparison, the feedback control module 235 determines a number of content items to include in the candidate content 310 to the content selection process 300.

In the example shown in FIG. 3, there are two stages in the content selection process 300: the first stage 320 and the second stage 330. In some embodiments, the target latency period is determined for each stage in the content selection process 300. The feedback control module 235 samples and compare latency period to a target latency period for each stage of the content selection process 300. The total target latency period for the content selection process 300 is 400 ms, and a portion of the total target latency period is assigned to the first stage (e.g., L1=100 ms) and a remaining portion of the total target latency period is assigned to the second stage (e.g., L2=300 ms). The distribution of the target latency period between the two stages may depend on the functions of the stages. For example, the first stage 320 may perform a preliminary filtering of content items while the second stage 330 may perform a more intensive analysis to determine users' affinity for content items in the candidate content 310 based on user information stored in the user profile store 205, action log 220, and edge store 225. Because the analysis performed in the second stage 330 is more complex than that of the first stage 320, the target latency period of the second stage 330 may be longer than the target latency period of the first stage 320.

The first stage 320 may determine whether the user has at least a threshold affinity for the users or objects associated with the candidate content 310 and remove content items in the candidate content 310 below the threshold affinity. The first stage 320 may evaluate whether information associated with the candidate content 310 satisfies at least a threshold number of targeting criteria associated with the user. The first stage 320 may also compare candidate content to previously presented candidate content items to which the user reacted negatively. For example, if a content item is a story published by a different user that the user blocked, the content item is removed and not evaluated in the second stage 330. The candidate content 310 may also be compared to content items presented to the user within a threshold time (e.g., within 30 minutes) to remove repetitive content. Based on the first stage analysis, a subset of the candidate content 310 that does not meet at least the threshold affinity is removed from the content selection process 300 and the remaining set of candidate content 310 that does meet at least the threshold affinity is provided to the second stage 330 to be evaluated.

In the second stage 330, the scores 340 may be determined for each content item in the candidate content 310 based on the user's characteristics and the user's affinity towards the content item and associated bidding value. Depending on the type of content items, the ranking system may be different. Content items identified by the computing devices are ranked based on the scores 340, and content items for presentation to the user selected based on the ranking. For example, ad requests are ranked based on their associated bid amounts and/or targeting criteria, while stories or other non-commercial content items are ranked based on a user's affinity for users or objects associated with the non-commercial content items. Content items having a threshold position in the ranking or the highest-ranked content items are selected and presented to the user. In one embodiment, one or more machine-learning algorithms are used to select the content items that are communicated to a client device for presentation to a user.

The online system 140 may select a target CPU utilization to be a percentage of the maximum CPU utilization of computing devices used to evaluate candidate content 310. Based on past performance of the computing devices, the feedback control module 235 may select the target CPU utilization to be a percentage of the maximum CPU utilization (e.g., 85% of maximum CPU utilization. The feedback control module 235 periodically determines the CPU utilization of the computing devices and compares the CPU utilizations with the target CPU utilization. Based on the comparison, the feedback control module 235 determines the number of threads used to evaluate candidate content 310 in the content selection process 300.

In some embodiments, the feedback control module 235 first divides the candidate content 310 into one or more batches, each batch containing a portion of the candidate content 310. The number of batches may depend on the number of content items in the candidate content 310 and the number of computing devices used by the online system 140. Based on the number of content items in the portion of candidate content 310, the feedback control module 235 may then determine the number of threads used for evaluation for each batch.

In the example shown in FIG. 3, the online system 140 selects a first target CPU utilization (C1=85%) and a second target CPU utilization (C2=80%) based on previously determined CPU utilization. In some embodiments, the CPU utilization may be controlled separately for the first stage 320 and the second stage 330. After the candidate content 310 is evaluated in the first stage 320, all of or a portion of the candidate content 310 are evaluated by the second stage 330 to determine scores 340 for the candidate content 310. In other embodiments, the CPU utilization C of the first stage 320 and the second stage 330 may be controlled together.

FIGS. 4A and 4B are block diagrams of a content selection process, a CPU utilization control mechanism, and a latency control mechanism, in accordance with an embodiment.

In the example shown in FIG. 4A, the content selection process 300 receives candidate content 310 and evaluates the candidate content 310 based on parameters received from the latency control mechanism 410 and the CPU utilization control mechanism 420. After evaluating the candidate content 310, the content selection process 300 determines scores 340 for the candidate content 310. The number of content items in the candidate content 310 and the rate of evaluation of the content selection process 300 depends on the latency control mechanism 410 and the CPU utilization control mechanism 420.

In some embodiments, the content selection process 300 evaluates a first set of candidate content 310 that includes N candidates according to a latency period parameter and a CPU utilization parameter. A latency period is determined for the evaluation of the N candidates in the first set of candidate content 310, and the latency control mechanism 410 compares the determined latency period with the target latency period. The latency period may be measured from the time at which a request is received for a content item for a user until the content item is selected and presented to the user based on scores 340 for the N candidates. If the determined latency period is shorter than the target latency period, the latency period parameter is updated to increase the number of content items in a second set of candidate content 310 that is evaluated during the next request for a new content item. The number of content items in the second set of candidate content 310 is N' candidates, where N' is greater than N. Similarly, if the determined latency period is longer than the target latency period, the latency period parameter is updated to decrease the number of content items in the second set of candidate content 310 such that N' is less than N.

In some embodiments, the latency control mechanism 410 may be a PID controller and computes a factor (e.g., a "PID multiplier"), and a base number of content items (e.g., N candidates) is multiplied by the factor to determine the number of content items to be evaluated (e.g., N' candidates). This determined number of content items in the second set is distributed among various computing devices for evaluation based on the sampled latency periods of each computing device. In one embodiment, the latency control mechanism 410 also accounts for historical interactions between a user and presented content items when distributing content items among computing devices. For example, the feedback control module 235 allocates a greater number of content items or parameters of content items to computing devices evaluating content items presentation to users with a history of generating at least a threshold amount of revenue through interacting with presented content items.

When the content selection process 300 evaluates the first set of candidate content 310, multiple content items may be evaluated at once using M threads. A CPU utilization control mechanism 420 determines a CPU utilization of the content selection process 300 when evaluating the first set of candidate content 310. The determined CPU utilization is compared to a target CPU utilization by the CPU utilization control mechanism 420. If the determined CPU utilization is less than the target CPU utilization, the CPU utilization parameter is updated to increase the number of threads in the second set of candidate content 310 to M' threads. When number of threads increases, more content items are evaluated at the same time with the same amount of resources so CPU utilization increases with increased amount of computing task. If the determined CPU utilization is greater than the target CPU utilization, the CPU utilization parameter is updated to decrease the number of threads in the second set of candidate content 310 such that M' is less than M.

In the example shown in FIG. 4B, the parameters received from latency control mechanism 410 and CPU utilization control mechanism 420 are different from the parameters in FIG. 4A. The latency control mechanism 410 determines the latency period of the content selection process 300 when evaluating a first set of candidate content 310 to be L latency. The latency control mechanism 410 updates the latency period parameter such that the latency period is the maximum latency period Lmax when a second set of candidate content 310 is evaluated following a future request for content.

In some embodiments, the CPU utilization control mechanism 420 controls the number of content items in the candidate contents 310 evaluated by the content selection process 300. The CPU utilization control mechanism 420 determines the CPU utilization of evaluating the first set of candidate content 310 of N candidates. The CPU utilization control mechanism 420 compares the determined CPU utilization to the target CPU utilization and updates the CPU utilization parameter based on the comparison. When the CPU utilization is lower than the target CPU utilization, the number of content items N' to be evaluated in the second set of candidate content 310 is increased such that N' is greater than N, and when the CPU utilization is higher than the target CPU utilization, the number of content items N' in the second set of candidate content 310 is decreased such that N' is less than N.

In addition to setting the number of content items that are evaluated in the content selection process 300, the CPU utilization control mechanism 420 also determines the number of threads used in the content selection process 300. In some embodiments, the number of threads is determined as a function of the number of candidate ads and a timeout value. The timeout value is a maximum time period that is allowed to elapse during the content selection process 300. A processing rate is determined by dividing the number of candidate ads by the timeout value. The number of threads is then calculated by dividing the processing rate by a theoretical processing rate. The theoretical processing rate may be an average value that represents the number of content items evaluated per unit of time that is updated after each iteration of the content selection process 300 (e.g., 10 content items/ms).

If the calculated number of threads is greater than a minimum number of threads but less than a maximum number of threads, the CPU utilization parameter is updated such that the number of threads M' in the second set of candidate content is set to the calculated number of threads. However, if the calculated number of threads is less than the minimum number of threads, the number of threads M' in the second set of candidate content is set to the minimum number of threads. If the calculated number of threads is greater than the maximum number of threads, the number of threads M' in the second set of candidate content is set to the maximum number of threads. The minimum number of threads and the maximum number of threads may depend on the type of devices and the number of devices used in the content selection process 300.

Figure 5:
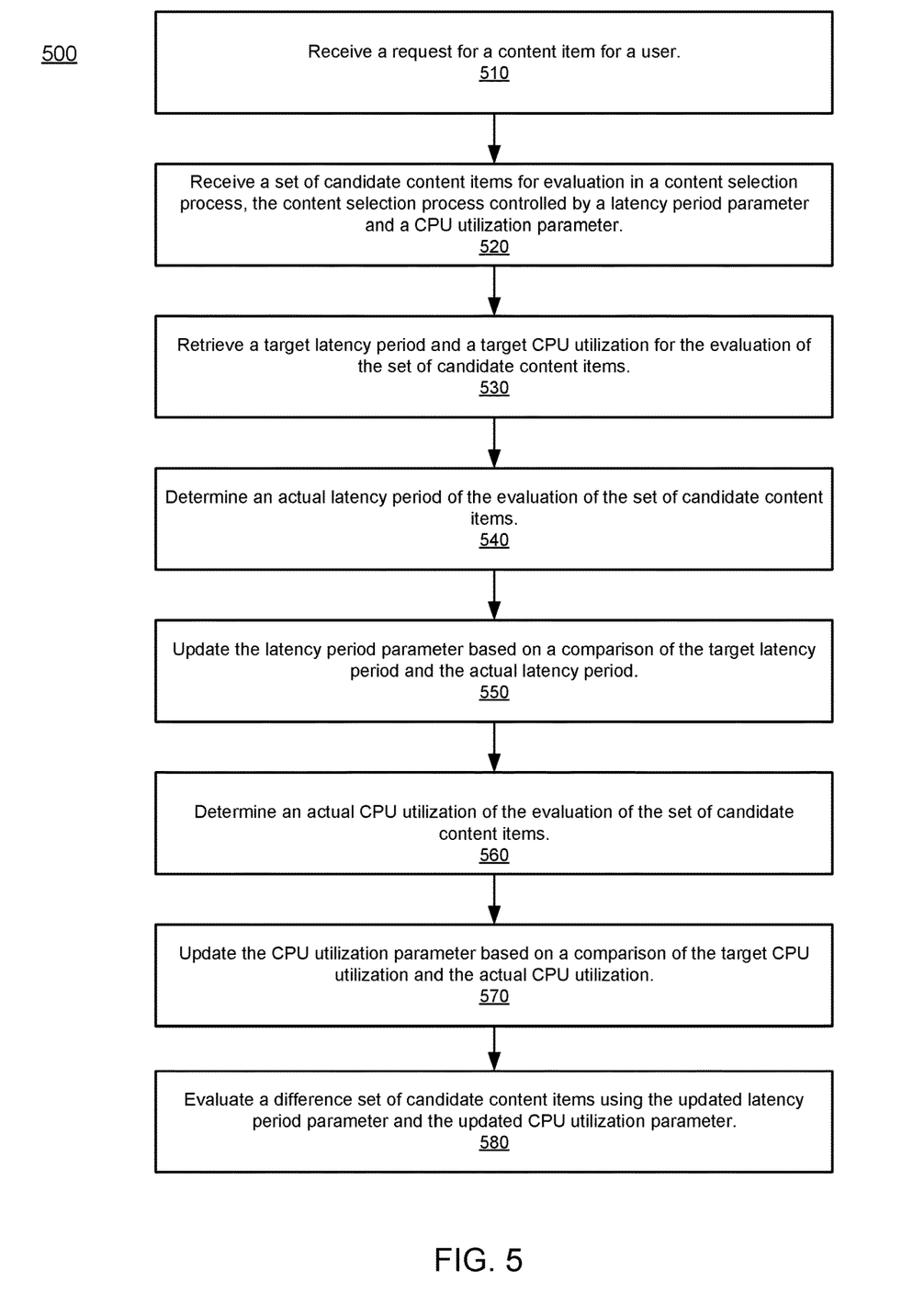
FIG. 5 is a flow chart of the content selection process, in accordance with an embodiment.

FIG. 5 is a flow chart of the content selection process, in accordance with an embodiment. The online system receives 510 a request for a content item for a user. After receiving the request, the online system receives 520 a set of candidate content items for evaluation in a content selection process, the content selection process controlled by a latency period parameter and a CPU utilization parameter. Each content item in the set of content items is associated with a set of targeting criteria. The targeting criteria identify characteristics of users that are eligible to be presented with its associated content item.

The online system has a feedback control module that controls the latency period and CPU utilization of each computing device used by the online system. For each computing device, the online system retrieves 530 a target latency period and a target CPU utilization for the evaluation of the set of candidate content items.

The online system determines 540 an actual latency period of the evaluation of the set of candidate content items. The latency period is compared to the target latency period, and a latency period parameter is updated 550 based on the comparison. The online system also determines 560 an actual CPU utilization of the evaluation of the set of content items. Based on a comparison of the target CPU utilization and the actual CPU utilization, a CPU utilization parameter is updated 570.

When the online system receives a request for a new content item, the online system evaluates 580 a different set of candidate content items using the updated latency period parameter and the updated CPU utilization parameter. The number of candidate content items in the different set of candidate content items and the number of threads used to evaluate the different set of candidate content items depends on the updated latency period parameter and the updated CPU utilization parameter.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a request for one or more content items for a user;
receiving a set of candidate content items for evaluation in a content selection process, the content selection process controlled by a latency period parameter and a CPU utilization parameter;
retrieving a target latency period and a target CPU utilization for the content selection process;
evaluating the set of candidate content items in the content selection process;
determining an actual latency period of the content selection process for the set of candidate content items;
updating the latency period parameter of the content selection process based on a comparison of the target latency period and the actual latency period;
determining an actual CPU utilization of the content selection process for the set of candidate content items;
updating the CPU utilization parameter based on a comparison of the target CPU utilization and the actual CPU utilization; and
evaluating a different set of candidate content items using the updated latency period parameter and the updated CPU utilization parameter in the content selection process.

2. The method of claim 1, wherein updating the latency period parameter comprises:
determining a number of candidate content items in the set of candidate content items corresponding to the actual latency period;

comparing the actual latency period to the target latency period; and responsive to determining that the actual latency period is shorter than the target latency period, setting a number of candidate content items in the different set of content items to be greater than the number of candidate content items in the set of content items.

3. The method of claim 1, wherein the latency period parameter is updated to a maximum latency period value.

4. The method of claim 1, wherein updating the CPU utilization parameter comprises:

determining a number of candidate content items in the set of candidate content items corresponding to the actual CPU utilization;

comparing the actual CPU utilization to the target CPU utilization; and responsive to determining that the actual CPU utilization is lower than the target CPU utilization, setting a number of candidate content items in the different set of content items to be greater than the number of candidate content items in the set of content items.

5. The method of claim 1, wherein updating the CPU utilization parameter comprises:

determining a number of threads used to evaluate the set of candidate content items associated with the actual CPU utilization;

comparing the actual CPU utilization to the target CPU utilization; and responsive to determining that the actual CPU utilization is lower than the target CPU utilization, setting a number of threads in the evaluation of the different set of candidate content items to be greater than the number of threads used in the evaluation of the set of candidate content items.

6. The method of claim 5, wherein the set of candidate content items are divided into one or more batches, each batch containing a portion of the set of candidate content items, and wherein each thread of the number of threads is associated with a batch.

7. The method of claim 5, wherein setting the number of threads in the evaluation of the different set of candidate content items comprises:

determining a processing rate by dividing the number of candidate content items in the set of candidate content items by a timeout value; and determining the number of threads by dividing the determined processing rate by a theoretical processing rate.

8. The method of claim 7, further comprising:

comparing the determined number of threads to a minimum number of threads; and responsive to determining that the number of threads is smaller than the minimum number of threads, setting the number of threads to the minimum number of threads.

9. The method of claim 7, further comprising:

comparing the determined number of threads to a maximum number of threads; and responsive to determining that the number of threads is greater than the maximum number of threads, setting the number of threads to the maximum number of threads.

10. The method of claim 1, wherein the target latency period is a percentile of prior latency periods of a device.

11. The method of claim 1, wherein the content selection process has multiple stages.

12. The method of claim 1, wherein the content selection process comprises:

determining a score for each of the candidate content items by applying a trained machine learning model to a set of characteristics of the user and a set of characteristics of the candidate content item, the machine learning model predicting a likelihood the user's interaction with the candidate content item; and selecting one or more of the candidate content items based on the scores.

13. A computer program product comprising a non-transitory computer-readable storage medium having instructions encoded thereon that, when executed by a processor, cause the processor to:

receive a request for one or more content items for a user;

receive a set of candidate content items for evaluation in a content selection process, the content selection process controlled by a latency period parameter and a CPU utilization parameter;

retrieve a target latency period and a target CPU utilization for the content selection process;

evaluate the set of candidate content items in the content selection process;

determine an actual latency period of the content selection process for the set of candidate content items;

update the latency period parameter of the content selection process based on a comparison of the target latency period and the actual latency period;

determine an actual CPU utilization of the content selection process for the set of candidate content items;

update the CPU utilization parameter based on a comparison of the target CPU utilization and the actual CPU utilization; and evaluate a different set of candidate content items using the updated latency period parameter and the updated CPU utilization parameter in the content selection process.

14. The computer program product of claim 13, wherein updating the latency period comprises:

determining a number of candidate content items in the set of candidate content items corresponding to the actual latency period;

comparing the actual latency period to the target latency period; and responsive to determining that the actual latency period is shorter than the target latency period, setting a number of candidate content items in the different set of content items to be greater than the number of candidate content items in the set of content items.

15. The computer program product of claim 13, wherein the latency period parameter is updated to a maximum latency period value.

16. The computer program product of claim 13, wherein updating the CPU utilization parameter comprises:

determining a number of candidate content items in the set of candidate content items corresponding to the actual CPU utilization;

comparing the actual CPU utilization to the target CPU utilization; and responsive to determining that the actual CPU utilization is lower than the target CPU utilization, setting a number of candidate content items in the different set of content items to be greater than the number of candidate content items in the set of content items.

17. The computer program product of claim 13, wherein updating the CPU utilization parameter comprises:
    determining a number of threads used to evaluate the set of candidate content items associated with the actual CPU utilization;
    comparing the actual CPU utilization to the target CPU utilization; and
    responsive to determining that the actual CPU utilization is lower than the target CPU utilization, setting a number of threads in the evaluation of the different set of candidate content items to be greater than the number of threads used in the evaluation of the set of candidate content items.

18. The computer program product of claim 17, wherein setting the number of threads in the evaluation of the different set of content items further comprises:
    determining a processing rate by dividing the number of candidate content items in the set of candidate content items by a timeout value; and
    determining the number of threads by dividing the determined processing rate by a theoretical processing rate.

19. The computer program product of claim 13, wherein the target latency period is a percentile of prior latency periods of a device.

20. The computer program product of claim 13, wherein the content selection process comprises:
    determining a score for each of the candidate content items by applying a trained machine learning model to a set of characteristics of the user and a set of characteristics of the candidate content item, the machine learning model predicting a likelihood the user's interaction with the candidate content item; and
    selecting one or more of the candidate content items based on the scores.

* * * * *